No. 620,913. Patented Mar. 14, 1899.
H. T. GRIFFITH.
DERRICK FRUIT GATHERER.
(Application filed May 28, 1898.)
(No Model.) 2 Sheets—Sheet 1.
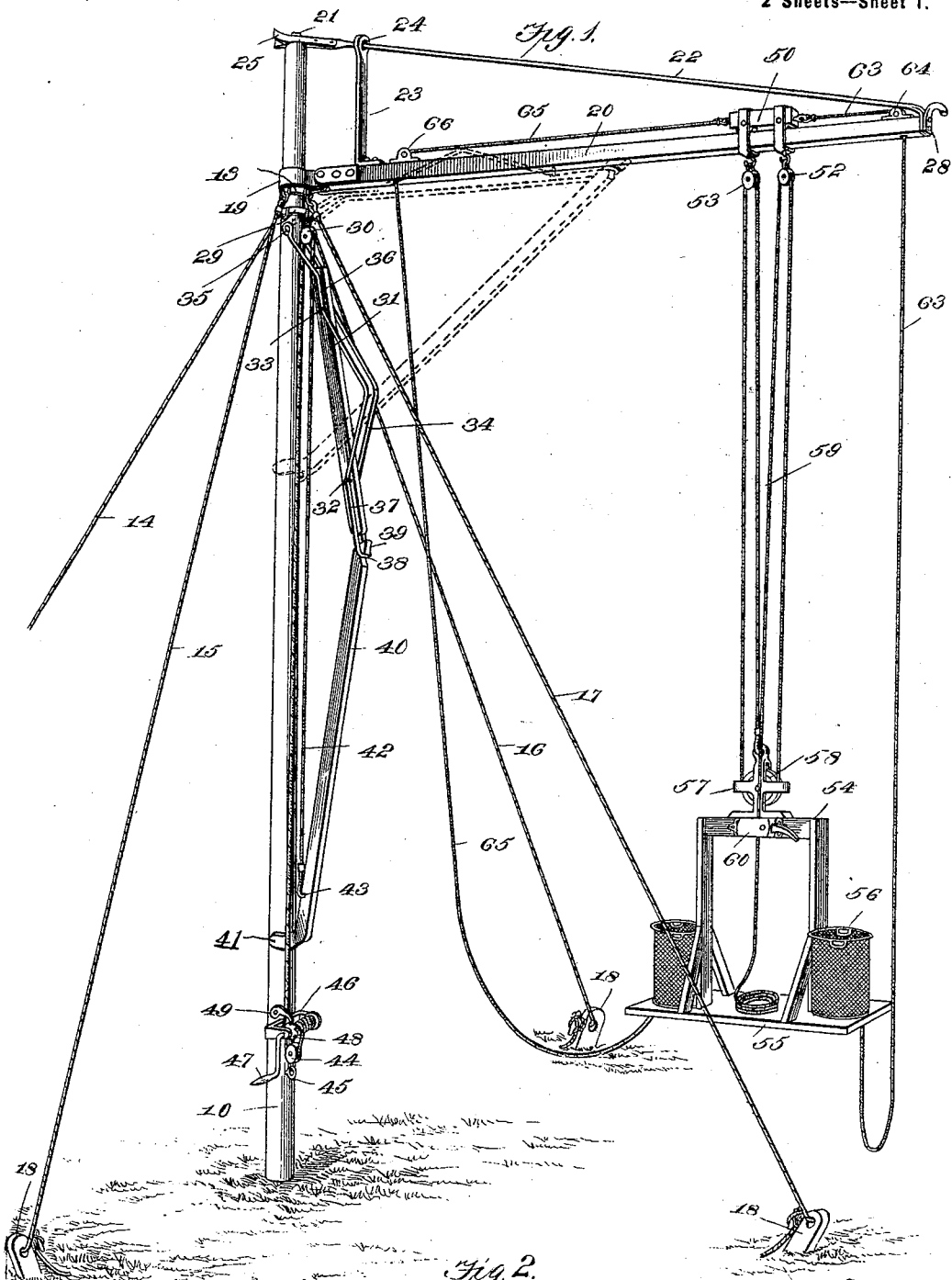
Witnesses
Inventor
H. T. Griffith,
by
Attorneys No. 620,913. Patented Mar. 14, 1899.
H. T. GRIFFITH.
DERRICK FRUIT GATHERER.
(Application filed May 28, 1898.)
(No Model.) 2 Sheets—Sheet 2.
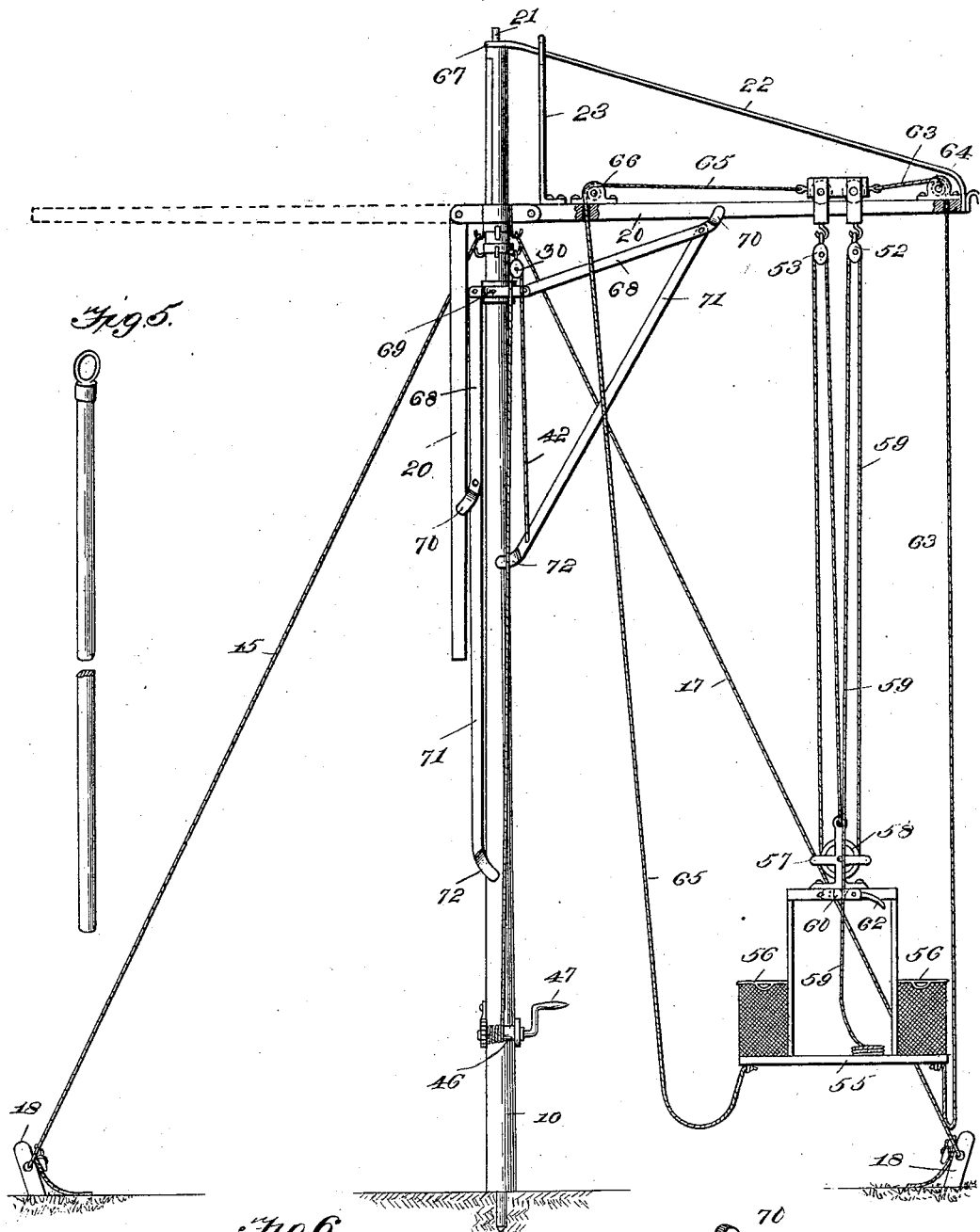
Witnesses
J. C. Shaw
Chas. E. Brock
Inventor
H. T. Griffith
by O'Mears
Attorneys

UNITED STATES PATENT OFFICE.

HENRY T. GRIFFITH, OF PORTLAND, OREGON, ASSIGNOR OF ONE-FOURTH TO F. E. ROWELL AND J. A. ROWELL, OF SCHOLLS, OREGON.

DERRICK FRUIT-GATHERER.

SPECIFICATION forming part of Letters Patent No. 620,913, dated March 14, 1899.

Application filed May 28, 1898. Serial No. 682,033. (No model.)

*To all whom it may concern:*

Be it known that I, HENRY T. GRIFFITH, a citizen of the United States, residing at Portland, in the county of Multnomah and State of Oregon, have invented a new and useful Derrick Fruit-Gatherer, of which the following is a specification.

My invention relates to means for gathering fruit from trees, the object of the invention being to enable a person to elevate himself within convenient reach of the fruit upon the tree and to shift his position either vertically or horizontally until he has brought himself into position to entirely strip the fruit from the tree.

With this object in view my invention consists in a fruit-gatherer comprising a pole to be erected as near as possible to the trunk of the tree and held upright by means of suitable guy-ropes secured to stakes driven into the ground, a pivoted beam mounted to slide upon the pole, means for elevating, lowering, and bracing the pivoted beam, a sliding carriage mounted upon the pivoted beam, a seat and basket-support suspended from the sliding carriage, and means connected with the seat and within easy reach of the occupant thereof for raising and lowering the seat and its occupant and propelling and sliding the carriage upon the pivoted beam either toward or from the pole.

My invention further consists in the improved construction, arrangement, and combination of parts hereinafter fully described and afterward particularly pointed out in the claims.

In order to enable others skilled in the art to which my invention most nearly appertains to make and use the same, I will now proceed to describe its construction and operation, having reference to the accompanying drawings, forming part hereof, in which—

Figure 1 is a perspective view of an apparatus constructed in accordance with my invention, the beam being shown in full lines raised to its operative position and the raising mechanism being shown in full lines in its lowered position and in dotted lines in its upper position. Fig. 2 is a detail view illustrating one manner of securing the bottom of a supporting-pole to the earth. Fig. 3 is a detail view illustrating the upper end of the stay-rod and the spring-arm for clamping the spur or reduced upper end of the pole. Fig. 4 is a view in side elevation of an apparatus constructed in accordance with my invention, in which the form of the beam-raising mechanism is slightly modified. Fig. 5 is a detail perspective view of a pole by means of which the beam may be elevated to its horizontal position without using the elevating mechanism. Fig. 6 is a view illustrating the line clamp or holder detached from the seat-frame. Fig. 7 is a detail perspective view of one of the bars of the beam-raising mechanism.

Like numerals of reference indicate the same parts in all the figures of the drawings.

Referring to the drawings by numerals, 10 indicates a post to be erected by the side of the trunk of a tree by planting the lower end in the earth in the usual manner or by means of the construction shown in Fig. 2, in which the lower end of the pole rests upon the ground and a stake 11 is driven into the ground alongside of the pole, the pole and stake being connected together by a hinge 12.

13 is a collar or band secured upon the pole a short distance below its upper end, provided with hooks to receive the upper ends of guy-ropes 14, 15, 16, and 17, which at their lower ends are secured to stakes 18, driven into the ground at proper distances from the pole, the pole being held rigidly upright in the well-known manner by means of said guy-ropes around the pole.

Just above the collar 13 is a collar 19, to which is hinged a beam 20, by means of which the beam may be raised to a horizontal position, as illustrated in Fig. 1 and on the right hand of Fig. 4, or lowered to a position parallel with the pole, as shown in full lines on the left of Fig. 4, the beam being also shown in its raised or horizontal position in dotted lines on the left of Fig. 4. A spur or point 21 projects centrally out of the upper end of the pole to a short distance above it, as clearly shown in Figs. 1 and 4.

22 indicates a stay-rod secured to the outer end of the beam 20 and held at a distance from the inner end of the beam by means of a brace 23, through an opening 24 in the upper end of which the stay-rod 22 is passed.

25 indicates a spring-plate secured to the stay-rod 22 at its inner end, the extreme outer ends 26 and 27 of the stay-rods and spring-plate being flared apart to facilitate their passage to opposite sides of the spur 21 when the beam 20 is raised, both the stay-rod and the spring-plate 25 being formed with notches, which when brought together form a complete circular opening to engage around the spur 21. The outer end of the stay-rod 22 is secured to the outer end of the beam 20 by means of suitable bolts or screws, which pass through the flat part of a hook 28 and through the end of the stay-rod into the end of the beam.

29 indicates another collar secured upon the pole just below the collar 13, from which collar 29 is suspended a pulley-block 30.

31 indicates a bar, to which is secured by means of staples 32 and 33 a wire or rod 34. This rod is pivotally secured at one end of the pole at 35 and at its opposite end behind the pole, as illustrated in Fig. 1, immediately opposite to the point 35. The wire 34 is bent in parallel lines from these points of connection with the pole, as plainly shown in Fig. 1, forming on each side of the bar 31 a short section at each end, as at 36 and 37, parallel with the bar and two parallel central portions extending some distance beyond the edge or side of the bar at a distance apart equal to the thickness of the bar. At the center of the wire 34 at the outer end of the bar 31 the wire is bent outward and backward, forming a loop 38, which engages over at the upper end 39 of another bar 40, provided at its lower end with forked arms 41 to partially embrace the pole. A hoisting-rope 42 is secured at 43 to the bar 40 at its lower end and extends upward through the block 30 and downward to and around a block 44, connected with the pole at 45, from whence the rope extends upward and is connected to a windlass 46, provided with the crank 47 to operate it and a ratchet-wheel 48 and pawl 49 to prevent the rope from unwinding when wound upon the windlass.

50 indicates a carriage which is mounted to travel longitudinally on a beam 20 and is provided with hooks on its lower side, from which depend pulley-blocks 52 and 53.

54 indicates a frame the bottom 55 of which is intended to be used as a seat for the operator, the end projections of said bottom being intended to support fruit-baskets 56. Mounted in a bracket 57, secured to the top of the frame 54, is a large grooved pulley 58. A rope 59 is secured at its lower end to the upper end of the bracket 57, from which it passes upward through the pulley-block 53, then down under and around the pulley 58, then up and through the block 52, and finally down and through a clamp 60, secured to the frame 54, said clamp being provided with a cam 61 with a handle 62, the cam being of such shape as to permit the free passage of the rope downward, but to prevent its passage upward while the cam is in its normal position and until the cam is released by means of the handle 62. At the outer end of the carriage 50 is secured a rope 63, which passes over a pulley 64, secured upon the top of the beam 20, and thence downward through an opening in the beam, its lower end being secured to the seat 55 within easy reach of the occupant. A similar rope 65 is secured to the opposite end of the carriage and passes over a pulley 66 and downward through an opening in the beam 20, being secured at its lower end to the seat 55 within easy reach of the occupant.

The foregoing description of the construction and arrangement of the various parts of my improved derrick fruit-gatherer has particular reference to Fig. 1; but the construction shown in Fig. 4 is the same except as now to be specified. Instead of the spring-clamp for engaging spur 21 at the upper end of the pole the stay-rod 22 is formed at its end 67 with a circular ring or eye to slip over the spur on the top of the pole. The lower block on the pole below the windlass 46 is omitted, and instead of the bars 31 and 40 and the wire 34 I have supplied a bar 68, pivotally connected to a collar 69, secured upon the pole and provided with forked outer ends 70 to embrace the beam 20 and slide thereon. To the bar 68, near its outer end, is pivoted a bar 71, the inner end of which is provided with grooved forked arms 72 to embrace the pole. This bar 71 takes the place of the bar 40 in the construction shown in Fig. 1, and the rope 42 is connected to it and fastens likewise over the block 30 and down to the windlass 46.

All of the parts of the device illustrated in full lines on the right-hand side of the pole may be duplicated on the left-hand side, and on the left-hand side of Fig. 4 I have shown some parts duplicated and lying parallel with the pole, while the beam 20 is shown in dotted lines in its raised position.

The construction of my invention will be readily understood by the foregoing description, and its operation will be described as follows: The pole having been planted by the side of the trunk of a tree in either of the manners hereinbefore described and braced by means of the guy-ropes, the bars 31 and 40 being in the position shown in full lines in Fig. 1 and the beam 20 hanging vertically parallel with the pole, by turning the crank 47 the rope is wound upon the windlass 46, which will draw the lower end of the bar 40 upward on the pole, the bar being guided in its upper motion by the forked arms 41. This upward movement of the lower end of the bar 40 will cause its upper end to move outward away from the pole, carrying the bar 31 and the beam 20 with it, the wires 34 embracing the beam, as shown in dotted lines in Fig. 1, and thereby preventing the lateral displacement of the beam from the bar 31. The continuation of its upward movement brings the bars 31 and 40 in the position shown in dotted lines in Fig. 1, when the beam 20 will have reached its extended horizontal position and the spring-clamp on the inner end of the stay-rod 22 will have engaged the spur 21 at the top of the pole, thus firmly holding the beam in its raised position. The bars 40 and 31 will be allowed to remain in their raised position, as shown in dotted lines, or may be again lowered, if desired, the beam 20 being held in its horizontal upper position, as shown, by means of the engagement of the spring-plate 25 and the end of the stay-rod 22 with the spur at the top of the pole. The operator now seats himself on the seat 55, when by pulling downward on the rope 59 he may raise himself to any desired elevation, and when he releases the rope it will be held by means of a clamp 60, thus retaining him in his elevated position. Should he at any time desire to approach the trunk of the tree while at any elevation, he can actuate the carriage and seat in that direction by drawing upon the rope 65, and when he desires to move farther away from the trunk of the tree this movement can be accomplished by drawing upon the rope 63. The operation with the modified frame shown in Fig. 4 is substantially the same, the inner end of the stay-rod 22 being placed by hand on the spur 21 instead of automatically engaging it and the outer end of the arm 68 sliding inward on the beam 20 while the beam is being raised.

From the foregoing it will be evident that I have provided an apparatus which may be quickly and easily mounted alongside of the trunk of any fruit-tree, by means of which apparatus a single person without assistance can gather all of the fruit upon the tree while seated at ease without the necessity of the employment of ladders and avoiding the injury to the fruit attendant upon the use of hand fruit-pickers and other devices by means of which fruit has been gathered heretofore.

By means of my simple and cheap apparatus the operator may raise and lower himself with the greatest ease while seated and can with equal ease approach or recede from the trunk of the tree, thus bringing himself within easy reach of any of the fruit upon the tree and leaving both hands free to pick the fruit therefrom and deposit it in baskets or any other receptacles which he always has at his side.

Should the apparatus for raising the beam to its operative position be broken or fail to work properly at any time, the operator may use a pole of ordinary construction, as shown in Fig. 5, provided with a ring at its upper end to engage the hook 28 at the outer end of the beam 20, whereby he may raise the beam to its horizontal position without losing the time necessary to repair or renew the hoisting mechanism.

While I have illustrated and described the best means now known to me for carrying out my invention, I do not wish to be understood as restricting myself to the exact details of construction shown, but hold that any slight variation therefrom such as might suggest itself to the ordinary mechanic would clearly be comprehended in the limit and scope of my invention.

Having thus fully described my invention, what I claim as new, and desire to secure by Letters Patent of the United States, is—

1. A derrick fruit-gatherer comprising a pole or standard adapted to be erected adjacent to the trunk of the tree, a beam pivoted near the top thereof, a seat suspended from the beam, a pair of pivoted bars pivoted together and normally hanging parallel with the pole and a hoisting-rope secured to the lower end of one of the bars and adapted to press the outer end of the other bar under the beam to raise it to a horizontal position, substantially as described.

2. The combination with the pole of a central spur projecting out of its top, the beam pivoted to the pole, the stay-rod secured at its outer end to the beam, and a spring-clasp at its inner end to automatically engage the spur of the pole when the beam is raised, substantially as described.

3. The combination with the pole and the pivoted beam, of a bar pivoted to the pole and having forked ends to embrace the lower side of the beam, a second bar pivoted at its outer end to the first bar near its outer end and having forked inner end embracing the pole, a pulley-block secured near the top of the pole, and a rope passing through the pulley-block and secured to the second bar near the pole, substantially as described.

HENRY T. GRIFFITH.

Witnesses:
W. W. SPROUL,
FRANK S. GRANT.